(12) United States Patent
Moberg (10) Patent No.: US 8,353,698 B2
(45) Date of Patent: Jan. 15, 2013

(54) CO-AXIAL INJECTION SYSTEM (75) Inventor: Goran Moberg, Cary, NC (US)

(73) Assignee: Nalco Mobotec, Inc., Naperville, IL (US)

(*) Notice: Subject to any disclaimer, the term of this patent is extended or adjusted under 35 U.S.C. 154(b) by 0 days.

(21) Appl. No.: 10/461,735

(22) Filed: Jun. 13, 2003

(65) Prior Publication Data
US 2005/0002841 A1     Jan. 6, 2005

(51) Int. Cl.
*F23N 1/00*     (2006.01)

(52) U.S. Cl. .................. 431/187; 431/9; 431/11; 431/8; 431/115; 431/177; 239/397.5; 239/132.3; 239/424; 239/145; 60/226.2; 60/230; 423/210; 423/235; 423/244.05; 423/244.01

(58) Field of Classification Search .................. 431/187, 431/354, 8, 4, 5, 190, 75, 9, 115, 11, 177; 432/235; 110/190, 215, 345; 239/398, 418, 239/422, 397.5, 132.3, 424, 145; 423/235, 423/210, 244.05, 244.01; 422/168, 172; 60/226.2, 230

See application file for complete search history.

(56) References Cited

U.S. PATENT DOCUMENTS

| | | | | |
|---|---|---|---|---|
| 3,713,588 A | * | 1/1973 | Sharpe | 239/400 |
| 3,847,564 A | * | 11/1974 | Marion et al. | 48/95 |
| 4,089,639 A | * | 5/1978 | Reed et al. | 431/211 |
| 4,208,386 A | | 6/1980 | Arand et al. | |
| 4,325,924 A | | 4/1982 | Arand et al. | |
| 4,491,456 A | * | 1/1985 | Schlinger | 48/197 R |
| 4,502,633 A | * | 3/1985 | Saxon | 239/422 |
| 4,525,175 A | * | 6/1985 | Stellaccio | 48/86 R |
| 4,704,971 A | * | 11/1987 | Fleischer et al. | 110/264 |
| 4,842,834 A | * | 6/1989 | Burton | 423/235 |
| 4,915,036 A | * | 4/1990 | DeVita | 110/215 |
| 4,927,612 A | | 5/1990 | Bowers | |
| 4,985,218 A | | 1/1991 | DeVita | |
| 4,992,249 A | | 2/1991 | Bowers | |
| 5,057,293 A | | 10/1991 | Epperly et al. | |
| 5,261,602 A | * | 11/1993 | Brent et al. | 239/132.3 |
| 5,285,967 A | * | 2/1994 | Weidman | 239/80 |

(Continued)

FOREIGN PATENT DOCUMENTS

EP     0 936 405     * 8/1999

*Primary Examiner* — Steven B McAllister
*Assistant Examiner* — Avinash Savani
(74) *Attorney, Agent, or Firm* — MacCord Mason PLLC (57) ABSTRACT

A coaxial injection device for injecting and dispersing reagents into a reactor, including an exterior duct for high-velocity gas injection; an outer-middle injector with at least one nozzle for liquid injection; an inner-middle duct for low-velocity gas injection; and an interior injector with nozzle for liquid injection; wherein, the exterior duct is formed by the internal wall of an insert and the external wall of the outer-middle injector; and is located externally to and circumferentially surrounds all other injectors and ducts; the outer-middle injector is formed by two concentric cylinders with end plate and injector nozzles; the inner-middle duct is formed by interior wall of the outer-middle injector and the exterior wall of the interior injector; the interior injector is formed by a cylinder with an endplate, the endplate having a nozzle; thereby ensuring the mixing and dispersion of the liquids and gases into the reactor to increase reaction homogeneity, reaction efficiency, reactor efficiency and reduced byproduct formation. A multiple coaxial injection device system and a method for operating the system are also described.

9 Claims, 4 Drawing Sheets

U.S. PATENT DOCUMENTS

| | | | |
|---|---|---|---|
| 5,310,334 A * | 5/1994 | Spiros | 431/5 |
| 5,342,592 A | 8/1994 | Peter-Hoblyn et al. | |
| 5,707,596 A * | 1/1998 | Lewandowski et al. | 423/235 |
| 5,762,486 A * | 6/1998 | Leger | 431/8 |
| 5,809,910 A | 9/1998 | Svendssen | |
| 5,941,459 A * | 8/1999 | Brooker et al. | 239/397.5 |
| 6,142,765 A * | 11/2000 | Ramaseder et al. | 431/9 |
| 6,190,628 B1 * | 2/2001 | Carter | 422/168 |
| 6,213,032 B1 * | 4/2001 | Breen et al. | 110/345 |
| 6,315,551 B1 * | 11/2001 | Salzsieder et al. | 431/183 |
| 6,485,289 B1 * | 11/2002 | Kelly et al. | 431/4 |
| 6,520,425 B1 * | 2/2003 | Reneker | 239/294 |
| 6,705,117 B2 * | 3/2004 | Simpson et al. | 65/134.4 |
| 6,773,256 B2 * | 8/2004 | Joshi et al. | 431/9 |
| 7,066,401 B2 * | 6/2006 | Huffman et al. | 239/132 |

* cited by examiner

Figure 3 ated compounds include U.S. Pat. No. 4,992,249 issued Feb.
CO-AXIAL INJECTION SYSTEM

BACKGROUND OF THE INVENTION (1) Field of the Invention

The present invention relates generally to chemical injection devices and, more particularly, to a co-axial chemical injection device using high-velocity gases.

(2) Description of the Prior Art

Chemical injection devices are generally known. Example of some prior art devices include U.S. Pat. No. 5,342,592 issued to Peter-Hoblyn et al. on Aug. 30, 1994 for Lance-type injection apparatus for introducing chemical agents into flue gases teaches the removal of sulfur oxides ($SO_x$) and nitrogen oxides ($NO_x$) from combustion effluents is enhanced by the supplying of reactants in a particular distribution pattern in the gas flow. To achieve the particular distribution pattern and to avoid impingement of the reactant on the heat exchanger tubes of the combustor, an elongated injection lance comprising c cooling jacket and plural spaced injections ports is employed. The cooling jacket protects the reactant supply to the injection ports from the high temperatures of the combustion gases.

U.S. Pat. No. 4,985,218 issued to DeVita on Jan. 15, 1991 for Process and injector for reducing the concentration of pollutants in an effluent teaches a process and apparatus for reducing the concentration of pollutants in an effluent from the combustion of a fuel or waste material is presented. The process and apparatus enables injection of an effluent treatment fluid at low treatment fluid flow rates yet provides an even dispersion of treatment fluid within an effluent passage with little or no clogging. An atomization conduit, positioned coaxially within a treatment fluid supply conduit, extends into the effluent and supplies an atomization fluid, such as steam or air. A treatment fluid is supplied through a supply conduit and through at least one jet in the atomization conduit wall at a velocity of between 2-60 feet per second, causing atomization of the treatment fluid within the nozzle.

U.S. Pat. No. 4,915,036 issued to DeVita on Apr. 10, 1990 for Boiler and injector for reducing the concentration of pollutants in an effluent teaches a process and apparatus for reducing the concentration of pollutants in an effluent from the combustion of a fuel or waste material is presented. The process and apparatus enables injection of an effluent treatment fluid at low treatment fluid flow rates yet provides an even dispersion of treatment fluid within an effluent passage with little or no clogging. An atomization conduit, positioned coaxially within a treatment fluid supply conduit, extends into the effluent and supplies an atomization fluid, such as steam or air. A treatment fluid is supplied through a supply conduit and through at least one jet in the atomization conduit wall at a velocity of between 2-60 feet per second, causing atomization of the treatment fluid within the nozzle.

U.S. Pat. No. 4,842,834 issued to Burton on Jun. 27, 1989 for Process for reducing the concentration of pollutants in an effluent teaches a process and apparatus for reducing the concentration of pollutants in an effluent from the combustion of a fuel is presented. The process and apparatus enables injection of an effluent treatment fluid at independently variable droplet sizes and distance of injection to a wide variety of distribution patterns within an effluent passage. An atomization conduit, positioned coaxially around a treatment fluid conduit, extends into the effluent and supplies an atomization fluid. The supply conduit is axially slidable with respect to the atomization conduit and supplying a treatment fluid through the supply conduit. The relative axial position of supply conduit and the atomization conduit is adjusted and the rate of flow of the atomization fluid is selected to inject droplets of a size effective to a desired distance within the passage.

The use of urea and NH3-generating compounds is known in the prior art. Example of the use of urea and NH3-generating compounds include U.S. Pat. No. 4,992,249 issued Feb. 12, 1991 to Bowers for Reduction of nitrogen- and carbon-based pollutants through the use of urea solutions and U.S. Pat. No. 4,927,612 issued May 22, 1990 invented by Bowers for Reduction of nitrogen- and carbon-based pollutants teaches process using a dispersion of aqueous urea solution is injected into an effluent for reducing nitrogen oxides in an effluent from the combustion of carbonaceous fuel.

U.S. Pat. No. 5,057,293 issued May 22, 1990 invented by Epperly, et al. and assigned to Fuel Tech, Inc. for Multi-stage process for reducing the concentration of pollutants in an effluent teaches a process for the reduction of the concentration of nitrogen oxides in the effluent from the combustion of a carbonaceous fuel, the process comprising selecting a plurality of locations for introduction of chemical formulations and introducing at each of said locations at least one chemical formulation, selected from the group consisting of urea, ammonia, hexamethylenetetraamine, an oxygenated hydrocarbon, a paraffinic hydrocarbon, an olefinic hydrocarbon, an aromatic hydrocarbon, an ammonium salt of an organic acid having a carbon to nitrogen ratio of greater than 1:1, a hydroxy amino hydrocarbon, a heterocyclic hydrocarbon having at least one cyclic oxygen, a five- or six-membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, methyl urea, and mixtures thereof, effective to reduce the concentration of nitrogen oxides at the effluent temperature existing at said location, such that optimization of the level of injection at each of said locations leads to the reduction of the level of nitrogen oxides below a predetermined target level.

U.S. Pat. No. 4,208,386 issued Jun. 17, 1980 to Arand, et al. for Urea reduction of NOx in combustion effluents and U.S. Pat. No. 4,325,924 issued to Arand, et al. on Apr. 20, 1982 for Urea reduction of $NO_x$ in fuel rich combustion effluents teach methods for reducing NOx in combustion effluents involving introducing urea into the combustion effluent.

SUMMARY OF THE INVENTION

The present invention is directed to a coaxial injection device for injecting and dispersing reagents into a reactor, including an exterior duct for high-velocity gas injection, an outer-middle injector with at least one nozzle for liquid injection, an inner-middle duct for low-velocity gas injection and an interior injector with nozzle for liquid injection; wherein, the exterior duct is formed by the internal wall of an insert and the external wall of the outer-middle injector; and is located externally to and circumferentially surrounds all other injectors and ducts; the outer-middle injector is formed by two concentric cylinders with end plate and injector nozzles; the inner-middle duct is formed by interior wall of the outer-middle injector and the exterior wall of the interior injector; the interior injector is formed by a cylinder with an endplate, the endplate having a nozzle; thereby ensuring the mixing and dispersion of the liquids and gases into the reactor to increase reaction homogeneity, reaction efficiency, reactor efficiency and reduced byproduct formation.

Another aspect of the present invention utilizes gas injected through the outer-middle injector.

The present invention is further directed to a multiple coaxial injector system including at least two coaxial injection devices and at least 1 reaction parameter probe; wherein the coaxial devices are located at spaced-apart locations along the reactor length and the reaction parameter probe is located downstream of the injector system.

The present invention is still further directed to a method for operating the multiple coaxial injector system, including the steps of sampling the reaction parameter; selecting the coaxial injection unit best suit for injecting the reagents; and injecting the reagents through the selected coaxial injection units.

Accordingly, one aspect of the present invention is to provide a coaxial injection device for injecting and dispersing reagents into a reactor, including an exterior duct for high-velocity gas injection, an outer-middle injector with at least one nozzle for liquid injection, an inner-middle duct for low-velocity gas injection and an interior injector with nozzle for liquid injection; wherein, the exterior duct is formed by the internal wall of an insert and the external wall of the outer-middle injector; and is located externally to and circumferentially surrounds all other injectors and ducts; the outer-middle injector is formed by two concentric cylinders with end plate and injector nozzles; the inner-middle duct is formed by interior wall of the outer-middle injector and the exterior wall of the interior injector; the interior injector is formed by a cylinder with an endplate, the endplate having a nozzle; thereby ensuring the mixing and dispersion of the liquids and gases into the reactor to increase reaction homogeneity, reaction efficiency, reactor efficiency and reduced byproduct formation.

Another aspect of the present invention is to provide a multiple coaxial injector system including at least two coaxial injection devices and at least 1 reaction parameter probe; wherein the coaxial devices are located at spaced-apart locations along the reactor length and the reaction parameter probe is located downstream of the injector system.

Still another aspect of the present invention is to provide a method for operating the multiple coaxial injector system, including the steps of sampling the reaction parameter; selecting the coaxial injection unit best suit for injecting the reagents; and injecting the reagents through the selected coaxial injection units.

These and other aspects of the present invention will become apparent to those skilled in the art after a reading of the following description of the preferred embodiment when considered with the drawings.

DETAILED DESCRIPTION OF THE PREFERRED EMBODIMENTS

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto. In this description of the embodiment, the term "duct" is used to describe a reagent injection passageway without any constriction on the end. The term "injector" is used to describe a reagent injection passageway with a constrictive orifice on the end. The orifice can be a hole or a nozzle. An injection device is a device that incorporates ducts or injectors or both.

Figure 1:
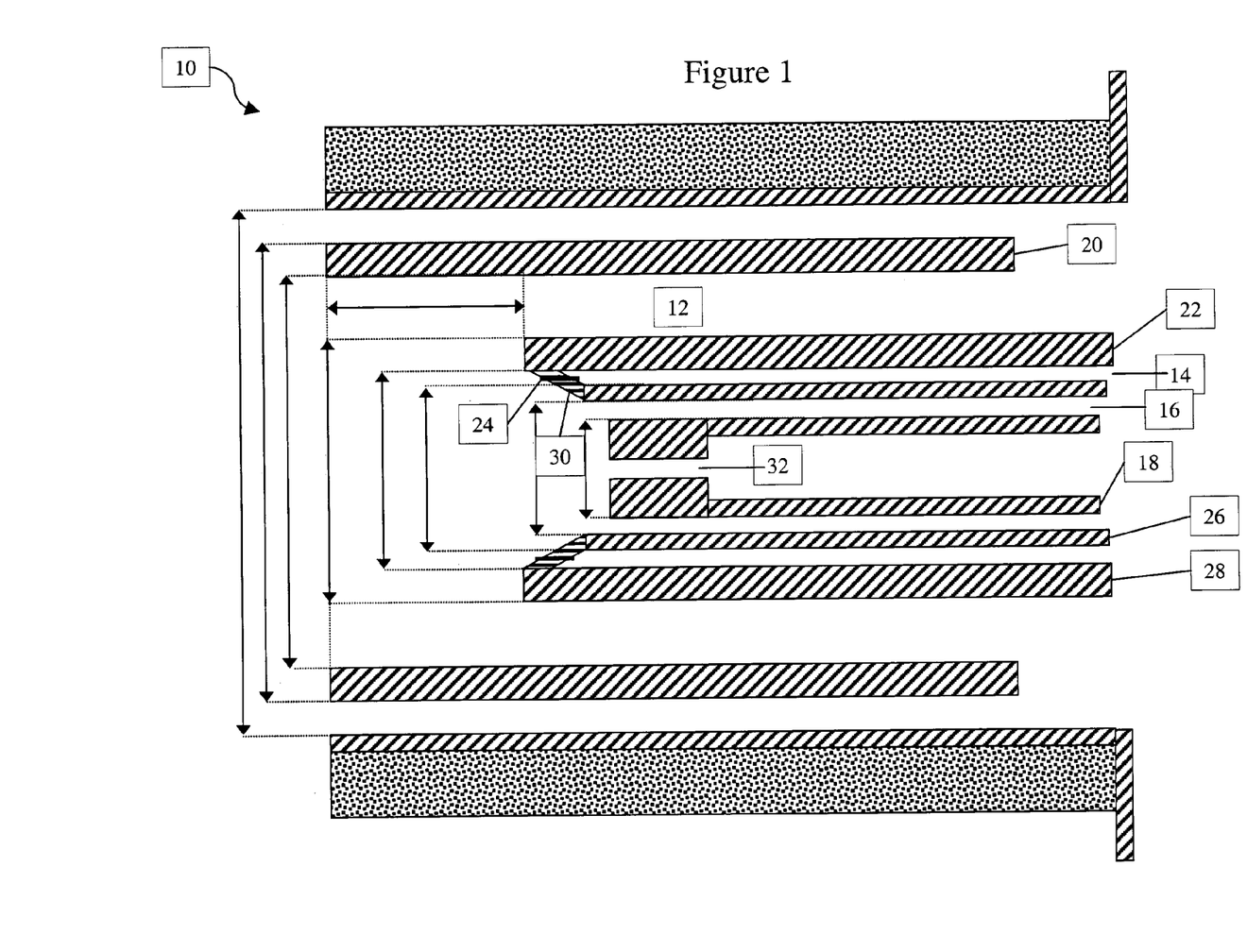
FIG. 1 is a cut-away, side view of a coaxial injection device constructed according to the present invention.
Figure 2:
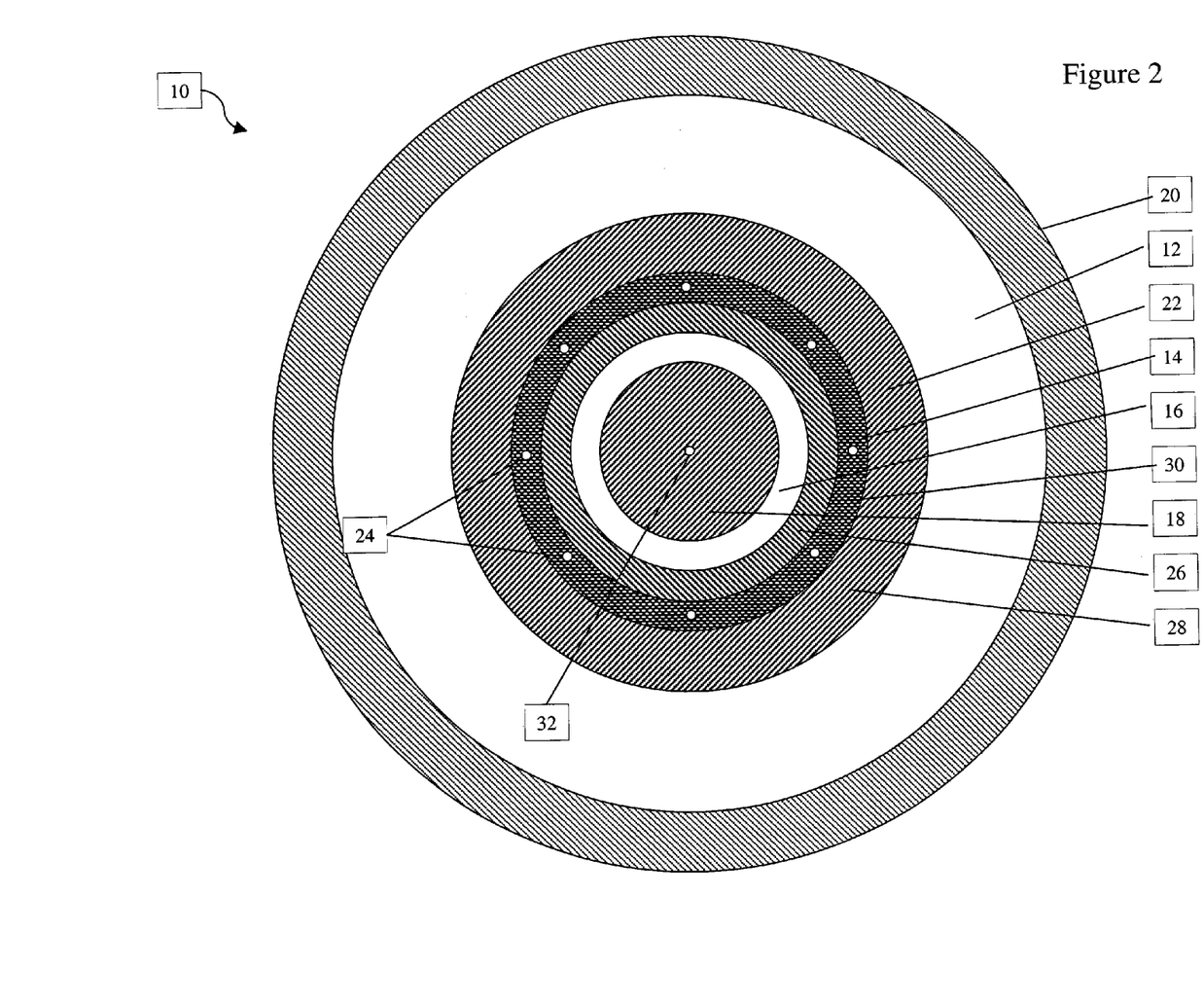
FIG. 2 is a cross-sectional view of a coaxial injection device constructed according to the present invention.

As best seen in FIGS. 1 and 2, a coaxial injection device according to the present invention, generally described as 10, is composed of an exterior duct 12, an outer-middle injector 14, an inner-middle duct 16, and an interior injector 18.

The exterior duct 12, or high-velocity gas duct, is designed for the injection of high-velocity gas in the reactor. For example, ROFA air can be injected into the reactor through the exterior duct for combustion furnaces. The high-velocity gas mixes and disperses material injected through the other ducts and injectors. For example, cooling water, cooling air, and a nitrogenous agent solution injected into combustion gases for the reduction of NOx are mixed by the ROFA air.

The high-velocity gas disperses solutions without the need for dispersing nozzles; therefore the reactor can use solutions containing particulate. This eliminates or reduces the requirement for pure reagents necessary to prevent obstruction of fine orifices. For example, this device allows the use of low-quality water as cooling water in combustion furnaces, thereby reducing operating expense and improving performance by reducing orifice plugging.

The high-velocity gas duct is formed by the internal wall of the insert 20 and external wall 22 of outer-middle injector 14. The duct is located externally to and circumferentially surrounds all other injectors and ducts, thereby ensuring the dispersion of all reagents injected through the device. The dispersion improves reaction homogeneity, thereby reducing byproduct formation.

Moving inward, the next component of the device is an outer-middle injector 14 with at least one injection orifice 24, such as a hole or nozzle. Preferably, the outer-middle injector has at least 8 nozzles, as shown in FIG. 2. The outer-middle injector is formed by two concentric cylinders 26 and 28 with a connecting end plate 30 and at least 1 injector orifice 24 in the endplate. This device preferably injects a liquid, for example, cooling water for cooling gases in proximity of injected urea droplets can be injected through this injector. The cooling water reduces free radical oxidation of NH3 to NOx by combustion gases. Alternatively, gases can be injected through this injector. For example, a cooling gas, such as low quality steam that cannot be used for effective power generation, can be injected instead of cooling water into a combustion furnace. Besides the cooling effect, the steam will increase the mass flow and assist the high-velocity gas in carrying and dispersing the other reagents into the furnace.

Moving inward, the next component of the device is an inner-middle duct 16. This duct is formed by the interior cylinder 26 of the outer-middle injector and exterior wall of the interior injector 18. A second gas is preferably injected through this duct. For example, cooling air to keep an injected urea solution cool prior to injection can be injected through this duct. The cooling air prevents urea decomposition prior to injection into the combustion furnace. The innermost component of the device is an interior injector 18 with constricting orifice 32. The interior injector is preferably formed by a hollow tube with endplate, preferably by a cylinder with endplate. The endplate preferably has a constricting orifice, such as a hole or nozzle. Preferably, liquids are injected into the reactor through this injector. For example, a concentrated nitrogenous agent solution can be injected for the reduction of NOx in a combustion furnace. The SNCR NOx reduction in the combustion gases thereby reduces acid emissions.

The nitrogenous agent can be selected from the group consisting of urea, ammonia, cyanuric acid, ammonium carbamate, ammonium carbonate, mixtures of ammonia and ammonium bicarbonate, one or more of the hydrolysis products of urea or mixtures or complexes thereof, compounds which produce ammonia as a byproduct, ammonium formate, ammonium oxalate, hexamethylenetetramine, ammonium salts of organic acids, 5- or 6- membered heterocyclic hydrocarbons having at least one cyclic nitrogen, hydroxy amino hydrocarbons, amino acids, proteins, monoethanolamine, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea.

Preferably, the nitrogenous agent is urea. More preferably, the nitrogenous agent is greater than about 20% aqueous urea w/w. Alternatively, more dilute solutions of nitrogenous reagent can be used.

The outer middle injector is preferably recessed in from the edge of the insert to protect the injector orifices from the reaction heat and reactants. The inner injector is recessed within the outer middle inject, to further protect it from the reaction heat and reactants.

Figure 3:
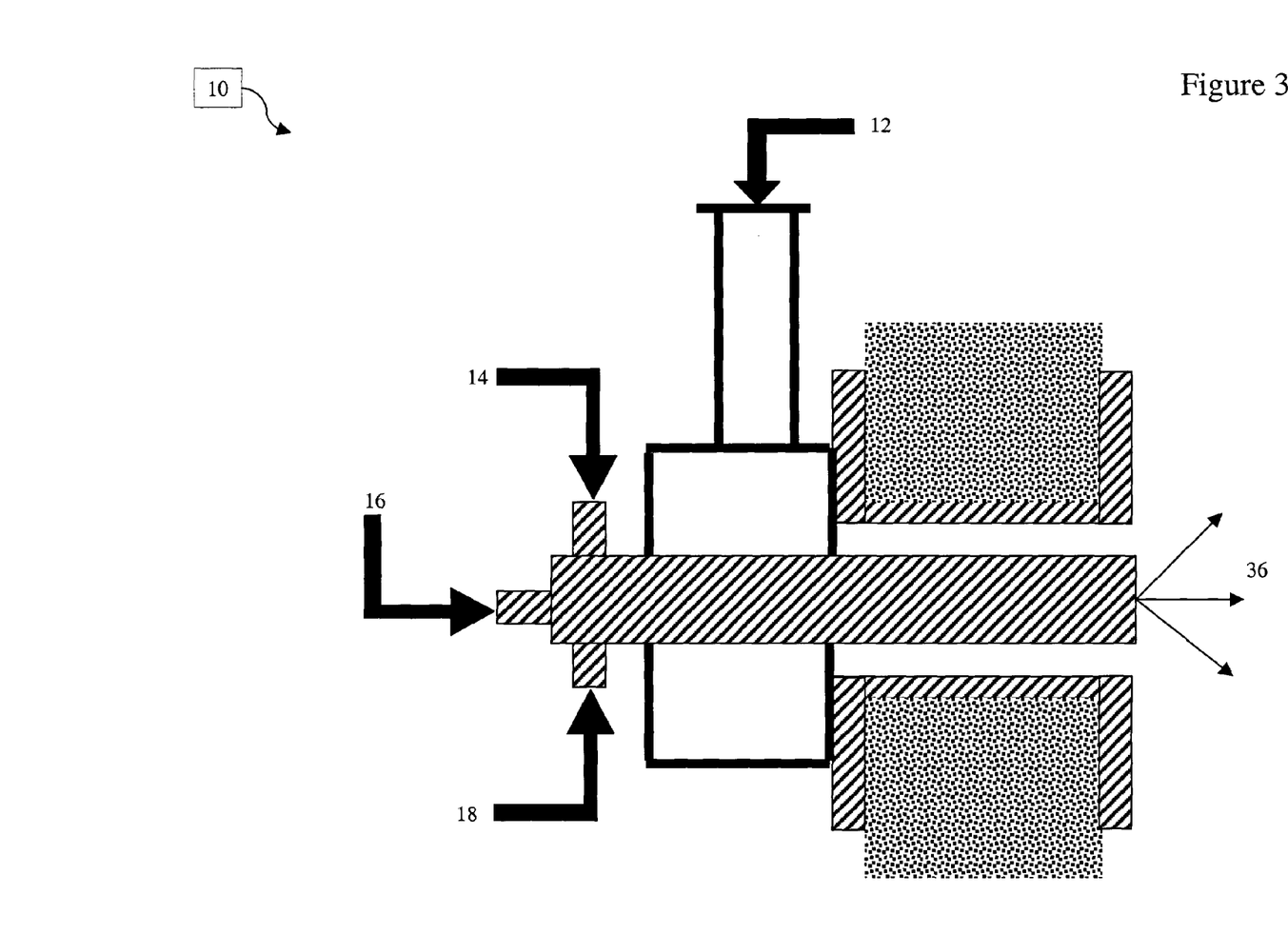
FIG. 3 is a top view of an installed coaxial injection device according to the present invention.

As shown in FIG. 3, high-velocity gas is injected through exterior duct 12, higher volume liquid is injected through the outer-middle injector 14, lower-volume gas, such as a cooling gas, is injected through the inner-middle duct 16, and a lower volume liquid is injected through the interior injector 18. The fluids exit the injector and the high-velocity gas disperses the liquids and other gas in the reaction space 36.

The system thus described allows great flexibility in the characteristics of the liquids used in a process. Because the high-velocity dispersing gas can effectively disperse large droplet size liquids, liquids containing particulates can be used in applications using the present invention, thus eliminating the need for the high-efficiency filtration systems to remove particulates from the liquid, as would be necessary in prior art systems which use dispersing nozzles that are easily obstructed to disperse the fluid.

Figure 4:
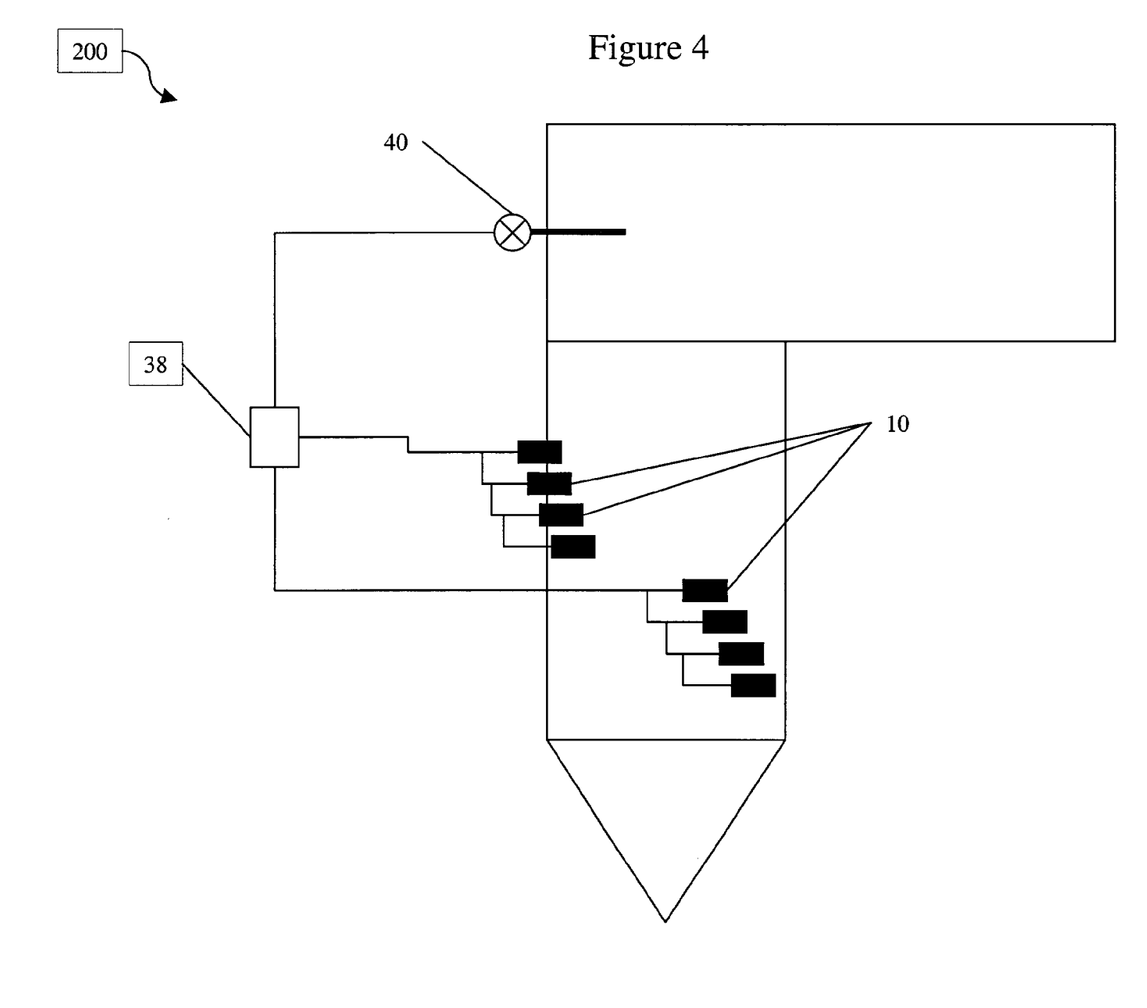
FIG. 4 is a schematic side view of a multiple coaxial device injection system according to the present invention.

As shown in FIG. 4, a multiplicity of coaxial injection devices 10 according to the present invention can be combined to form a multiple coaxial injection system, generally described as 200. The system includes a system controller 38. The multiple coaxial injection system can be operated to provide higher efficiency reactions and reduced byproducts.

The multiple coaxial injection devices are installed at spaced-apart locations along the reactor length. At least 1 probe 40 is installed downstream of at least one of the injectors of the system. Preferably, the probe is installed downstream of the last injector. In an example embodiment, the injectors are positioned along a combustion furnace and the probe is a temperature probe installed at the end of the combustion chamber.

A method of using the multiple coaxial injection system includes the following steps:
1) measuring reactor parameter;
2) selecting the coaxial injection device most suitable for injecting the secondary reagent; and
3) injecting the secondary reagent through the selected coaxial injection devices.

An optional step includes flushing deselected coaxial injection devices with a cleaning fluid to prevent fouling.

A specific example of the reduction of NOx in a combustion furnace using urea with a co-axial device according to the present invention follows:

A combustion furnace operating at approximately 1300 degrees C. was fitted with devices according to the present invention in a manner to produce ROFA conditions inside the combustion space. The pressure of the injected high-velocity ROFA air was adjusted to between about 1 and about 20 bar relative to the combustion space to provide sufficient mass flow to ensure adequate turbulence for mixing and heat exchange. A 20% urea solution was injected through the inner injector at a stoichimetric rate of from about 0.1 to about 6.0 NH3/NOx ratio. Greater NOx reduction was achieved with a NH3/NOx ratio between about 1 and about 2. Cooling water was injected at about 0.5 to about 40H2O/NH3 ratio. Greater reduction in NOx was achieved with a H2O/NH3 ratio between about 1 to about 6. The temperature of the cooling air was maintained below 100 degrees C. and the velocity was maintained above about 2 m/s to ensure that the urea solution was not boiling in the inner injector.

The system thus described was successful in reducing NOx output approximately 40% versus the prior operation regimen.

Thus, a method for reducing the NOx in a combustion effluent, includes the steps of: providing a multiple coaxial injection system according to the present invention; sampling the effluent temperature; selecting at least one of the coaxial injection devices best suit for injecting an NH3-generating reagent; and injecting the NH3-generating reagent through the selected coaxial injection units.

Certain modifications and improvements will occur to those skilled in the art upon a reading of the foregoing description. For example, the device according to the present invention provides for large diameter orifices for introducing alternative NH3 sources, such as algae, which grows in the cooling ponds of the power genreation facilities. All modifications and improvements have been deleted herein for the sake of conciseness and readability but are properly within the scope of the following claims.

The invention claimed is:

1. A coaxial injection device for injecting and dispersing reagents into a reactor, comprising:
an exterior duct configured to inject high-velocity gas into the reactor to disperse the reagents into the reactor;
an outer-middle injector with at least one constricting orifice for liquid injection, the outer-middle injector being recessed relative to the exterior duct and having a cooling liquid water or cooling steam therein;
an inner-middle duct for low-velocity gas injection, the inner-middle duct being recessed relative to the outer-middle injector, wherein the inner-middle duct is in communication with a supply of cooling air, the supply of cooling air having a velocity less than the high-velocity gas of the exterior duct that is chosen to disperse reagents into the reactor; and
an interior injector with a constricting orifice for liquid injection, the interior injector having a liquid urea solution therein;
wherein the exterior duct is formed by the internal wall of an insert and the external wall of the outer-middle injector; and is located externally to and circumferentially surrounds all other injectors and ducts; the outer-middle injector is formed by two concentric cylinders connected with an endplate, the endplate being substantially perpendicular to the two concentric cylinders and defining at least one injector orifice configured to inject reagents into the reactor; the inner-middle duct is formed by the interior wall of the outer-middle injector and the exterior wall of the interior injector; the interior injector is formed by a cylinder with the endplate being substantially perpendicular to the interior injector cylinder and defining the constricting orifice of the interior injector;

wherein the exterior duct injects high-velocity gas to disperse the reagents injected through the outer-middle injector, the inner-middle duct and the interior injector thereby ensuring the mixing and dispersion of the liquids and gases into the reactor to increase reaction homogeneity, reaction efficiency, reactor efficiency and reduced byproduct formation.

2. The device of claim 1, wherein cooling steam is contained in the outer-middle injector.

3. A multiple coaxial injection device system comprising at least two coaxial injection devices of claim 1 and at least one reaction parameter probe; wherein, the coaxial devices are located at spaced-apart locations along the reactor length and the reaction parameter probe is located downstream of the injection devices.

4. The system according to claim 3, wherein the parameter probe is a temperature probe and the injected fluids are high-velocity secondary air, cooling water, cooling air, and urea solution in the exterior duct, outer-middle injector, inner-middle duct, and interior injector, respectively, for the reduction of NOx in a combustion process.

5. The system of claim 3, wherein the parameter probe is a temperature probe and the injected fluids are high-velocity secondary air, low quality steam, cooling air, and urea solution in the exterior duct, outer-middle injector, inner-middle duct, and interior injector, respectively, for the reduction of NOx in a combustion process.

6. A method for operating the system of claim 3, comprising the steps of:

sampling a reaction parameter;

selecting at least one coaxial injection device best suited for injecting a secondary reagent, said at least one coaxial injection device comprising an exterior duct configured for injecting high-velocity gas into the reactor to disperse the reagents into the reactor;, an outer-middle injector with at least one constricting orifice configured for liquid injection into the reactor, an inner-middle duct for low-velocity gas injection, and an interior injector with a constricting orifice for liquid injection; wherein, the exterior duct is formed by the internal wall of an insert and the external wall of the outer-middle injector and is located externally to and circumferentially surrounds all other injectors and ducts, the outer-middle injector is formed by two concentric cylinders connected with the endplate, the endplate defining the orifice, the inner-middle duct is formed by interior wall of the outer-middle injector and the exterior wall of the interior injector; the interior injector is formed by a cylinder with an endplate, the endplate defining the orifice;

injecting a cooling liquid water or cooling steam through the outer-middle injector;

injecting the secondary reagent through the at least one selected coaxial injection device into a furnace having effluent prior to injecting; and reacting the secondary reagent with the furnace effluent.

7. A method for reducing the NOx in a combustion effluent, comprising the steps of:

providing a system according to claim 3;

sampling the effluent temperature;

selecting at least one coaxial injection device best suited for injecting an NH3-generating reagent;

injecting the NH3-generating reagent through the at least one selected coaxial injection device.

8. The method of claim 7, wherein the NH3-generating reagent is urea.

9. The method of claim 8, wherein injected fluids are high-velocity secondary air, cooling water, cooling air, and urea solution in the exterior duct, outer-middle injector, inner-middle duct, and interior injector, respectively, for the reduction of NOx in a combustion process.

* * * * *

UNITED STATES PATENT AND TRADEMARK OFFICE
CERTIFICATE OF CORRECTION

| | | |
|---|---|---|
| PATENT NO. | : 8,353,698 B2 | Page 1 of 1 |
| APPLICATION NO. | : 10/461735 | |
| DATED | : January 15, 2013 | |
| INVENTOR(S) | : Goran Moberg | |

It is certified that error appears in the above-identified patent and that said Letters Patent is hereby corrected as shown below:

In Column 1, Line 20, after the word comprising and before the word cooling, the letter "c" should be deleted In Column 2, Line 22, in the word hexamethylenetraamine, the double a in the last part of the word is a typographical error and one of the letters "a" should be deleted.

In Column 6, Line 40, the "e" and the "r" in generation have been transposed. The typographical error should be corrected.

Signed and Sealed this
Nineteenth Day of March, 2013

Teresa Stanek Rea
*Acting Director of the United States Patent and Trademark Office*